UNITED STATES PATENT OFFICE.

CARLOS BUTTY AND FLORENCIO ALVO, OF BUENOS AIRES, ARGENTINA.

PRODUCT IMITATING CHINA.

1,351,617.   Specification of Letters Patent.   Patented Aug. 31, 1920.

No Drawing.   Application filed June 18, 1919.   Serial No. 304,979.

*To all whom it may concern:*

Be it known that we, CARLOS BUTTY and FLORENCIO ALVO, both citizens of the Argentine Republic, residing at Calle Maipú 671, Buenos Aires, Argentine Republic, have invented new and useful Improvements in Products Imitating China, of which the following is a specification.

This invention relates to a new industrial product, adapted to be used as an imitation of china, marble and the like and which in consequence is particularly suitable for the manufacture of buttons, insulators, objects of art, etc., and other articles not destined to get in contact with fire.

The following are the ingredients used in its composition: sulfur in a proportion of 40%; clay, Portland or Roman cements or earths in a proportion of 60%, and a sufficient amount of coloring matter.

*Mode of preparation.*

The above ingredients are mixed and heated on fire until they are converted into a liquid condition. The liquid mass is then poured into suitable molds, of perfectly smooth surface and after a few minutes, on cooling, the mass will settle and grow hard. When withdrawn from the molds, the articles will be found to be well polished. By submitting the contents of the molds to pressure, the resulting objects will be of such a degree of hardness that they may be considered as being nearly unbreakable.

*Properties.*

The properties of this "imitation of china" are the following: It resists well the changes of weather; it is not attacked by acids; it is highly impervious and a perfect insulator of electricity; it has good molding conditions and may be given a high polish. It adapts itself particularly for the imitation of veined marbles.

Having now described the nature of our said invention, we declare that what we claim and desire to secure by Letters Patent, is:

1. A composition for forming articles in imitation of china, consisting of sulfur 40%, clay and cement 60%, and a coloring matter.

2. The method herein described of forming imitation china, consisting in subjecting a mixture of sulfur, cement, and clay in about the proportion specified to the action of heat to convert it into a liquid mass, and then molding the mass into articles.

CARLOS BUTTY.
FLORENCIO ALVO.

Witnesses:
ROSENDO ROMEN,
L. A. FORIAN.